United States Patent Office 3,439,131
Patented Apr. 15, 1969

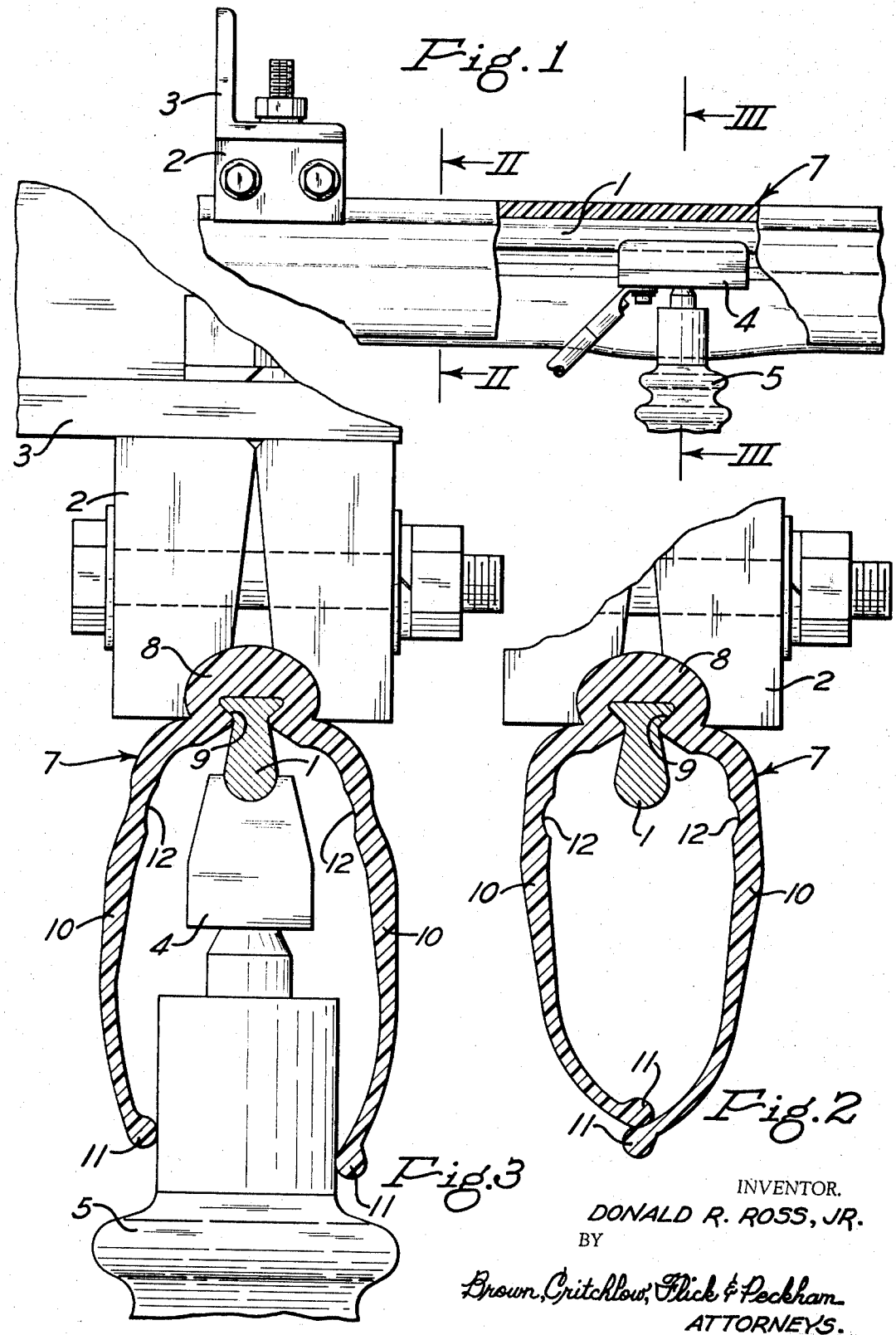

3,439,131
TROLLEY CONDUCTOR GUARD
Donald R. Ross, Jr., Bridgeville, Pa., assignor to U-S Electric Manufacturing Company, Pittsburgh, Pa., a partnership
Filed Mar. 30, 1967, Ser. No. 627,210
Int. Cl. B60m 1/04, 1/16
U.S. Cl. 191—25         4 Claims

ABSTRACT OF THE DISCLOSURE

A trolley conductor guard is provided with longitudinal grooves along the upper portions of its side walls to increase the flexibility of the walls. Also, the lower portions of the walls may be reduced in thickness for the same purpose.

Background of the invention

The trolley systems for electric cranes and the like include an electrical conductor or trolley wire, along the bottom of which runs or slides a current collector in the form of a grooved wheel or a grooved shoe. The collector collects current from the wire and delivers it to an electric motor or control device. It is common practice to enclose the trolley conductor and movable collector in an insulating guard to prevent accidental contact with them and to keep the engaging surfaces of the conductor and collector clean. Such a guard is a tubular member or sleeve, made of flexible material, through which the conductor extends and which the conductor supports. To accommodate the collector, the guard extends a considerable distance below the wire, and to permit the collector supporting member to move the collector along the wire the tubular guard is split lengthwise along its bottom. The guards usually are made of Koroseal, a plastic Du Pont product, although they could be made of other plastics or rubber. In any event, when the guards are installed outside, or even inside where it is cold, cold weather causes them to become stiff and resist opening at the bottom as the collector-supporting members slide along between the lower edges. This increases the friction against such members and wears them. Also, Koroseal guards are made by extruding heated plastic material and then running them through water to cool them. As the guards emerge from the cooling bath they are coiled for shipment. However, due to the thickness of the walls of the guards, their insides often do not solidify until after cooling, so the guards take a curved set. When uncoiled and straightened out for use, one side of a guard is slightly longer than the other side and therefore the long side puckers or forms gaps along the bottom of the guard. This allows dirt to enter the guard.

It is among the objects of this invention to provide a trolley conductor guard which is more flexible at low temperatures than heretofore, and which does not pucker or gap where the lower edges overlap each other.

In accordance with this invention, a flexible sleeve of insulating material, which is adapted to extend along and enclose a trolley conductor, is elongated in vertical section. It has a head provided in its bottom with a central slot for receiving only the upper portion of the conductor. The sleeve also has side walls extending outwardly from the head and downwardly. The side walls are provided with overlapping lower edges. The inside of the downwardly extending portions of the side walls is provided with a pair of opposed longitudinal grooves near the head to increase the flexibility of the side walls to permit the portions of the walls below the grooves to be spread apart more easily. Preferably, the thickness of the lower portions of the side walls is reduced relative to their upper portions to further increase their flexibility.

The preferred embodiment of the invention is illustrated in the accompanying drawings, in which—

FIG. 1 is a fragmentary side view of a trolley conductor guard, partly broken away to show the conductor and current collector; and FIGS. 2 and 3 are enlarged vertical sections taken on the lines II—II and III—III, respectively, of FG. 1.

Referring to FIGS. 1 and 2 of the drawings, a trolley conductor 1 is stretched tightly between rigid supports (not shown), from which it is insulated. Electric current is delivered to the conductor in a well-known manner. Between its ends, the conductor is supported at intervals by hangers 2 attached to suitable rigid brackets 3. Electric current is collected from the electrical conductor by means of a trolley shoe 4 that slides along the bottom of it. The shoe is supported by an insulator 5 mounted on a pole or other holder, which urges the shoe up against the conductor. The top of the shoe is provided with a longitudinal groove that receives the lower part of the trolley conductor so that the shoe will be guided along it.

The trolley conductor and shoe are covered and protected by a tubular or sleeve-like guard 7 that surrounds them. The guard hangs on the conductor. It is made of flexible insulating material, such as natural or synthetic rubber or a synthetic plastic. Du Pont's Koroseal is recommended. To hold the guard in place, the top or head 8 of the sleeve is provided in its bottom with a central slot 9 extending lengthwise of the sleeve. The slot is shaped to receive only the upper portion of the conductor, which usually flares upwardly so that the slot is wider at its top than at its bottom. The head is gripped at intervals in the hangers 2 that clamp the sides of the head tightly against the conductor to support it and to prevent it from tilting sideways in the hangers.

The side walls 10 of the sleeve extend outwardly in opposite directions from head 8 and then downwardly a considerable distance below the conductor, so that the sleeve is elongated vertically in cross section. The side walls are spaced from the sides of the collector shoe and have free lower edges that overlap each other for most of their length. However, where the insulator 5 happens to be located at any given moment, it engages and spaces the lower edges of the sleeve apart as shown in FIG. 3. These lower edges of the sleeve preferably are thickened to provide stiffening beads 11. Away from the insulator, only the beads overlap, with their centers disposed substantially in the central vertical longitudinal plane of the sleeve as shown in FIG. 2. Consequently, as the lower edges of the sleeve overlap only a slight distance, they do not have to be moved laterally as far as heretofore by the insulator as it slides along between them. This is an advantage in cold weather when the guard loses some of its flexibility.

Another feature of this invention is that provision is made for increasing the flexibility of the side walls of the guard to reduce the effort required to spread the beads apart in cold weather. Accordingly, near the tops of the downwardly extending portions of the side walls, they are provided inside with a pair of opposed longitudinal grooves 12. These grooves reduce the thickness of the side walls beside the bottom of the conductor to provide hinge areas where the walls will bend more easily when the insulator slides along between them. Even though the guard may become stiffer when cold, the stiffness will be offset to a considerable extent by the thin wall sections at the grooves.

The flexibility of the guard can be increased still further by reducing the thickness of the lower portions of its side walls. This reduction can start a short distance below the grooves. For example, the downwardly extending portions of the side walls may be of uniform thickness, except for the grooves, for about a third of their height, and the grooves can be in the center of the uniform thickness walls. From the latter, the side walls may taper downwardly in thickness approximately another third of the side wall height, and then become uniform in thickness again until the beads are reached. It is preferred that the side walls at the grooves be substantially as thin as the thin lower portions of the walls. When the beads are spread by insulator 5, the side walls not only will bend at the grooves but also will flatten out as shown in FIG. 3.

An additional advantage of reducing the wall thickness of the lower portions of the guard is that it enables those portions to solidify throughout their thickness as the guard travels through a cooling bath directly after it has been extruded. Consequently, the thinner portions of the side walls have already taken their permanent set before the guard is coiled on a reel, so that their lower edges will overlap properly and form a seal when the guard is straightened out and mounted on a trolley conductor.

According to the provisions of the patent statutes, I have explained the principle of my invention and have illustrated and described what I now consider to represent its best embodiment.

I claim:

1. The combination with a trolley conductor, of a guard comprising a flexible sleeve of insulating material extending along the conductor and being elongated vertically in cross section, the sleeve having a head provided in its bottom with a central slot extending lengthwise thereof receiving only the upper portion of the conductor, the sleeve having side walls spaced from the conductor extending outwardly and then downwardly from the head, said side walls being provided with free overlapping lower edges, and the inside of the downwardly extending portions of said side walls being provided with a pair of opposed longitudinal grooves near their tops spaced laterally from the conductor and reducing the wall thickness, whereby the flexibility of the side walls is increased at said grooves to permit the portions of the walls below the grooves to be spread apart more easily.

2. A trolley conductor and guard combination according to claim 1, in which said grooves are in portions of the side walls having uniform thickness, the thickness of the lower portions of the side walls is substantially the same as the thickness of the walls at said grooves, and said lower portions are joined by downwardly tapered intermediate portions with said portions of uniform thickness.

3. A trolley conductor and guard combination according to claim 1, in which the thickness of the lower portions of said side walls is reduced as compared with the upper portions, said free overlapping edges are thickened to provide beads, said grooves are in portions of side walls having uniform thickness, and said reduced lower portions are joined by downwardly tapered portions to said portions of uniform thickness.

4. A trolley conductor and guard combination according to claim 3, in which said wall portion of uniform thickness, said downwardly tapered wall portion and said reduced lower portion each constitute about one-third of the height of the downwardly extending portion of each side wall.

References Cited

UNITED STATES PATENTS

| | | | |
|---|---|---|---|
| 657,830 | 9/1900 | Petzenburger | 191—31 |
| 2,668,199 | 2/1954 | Connell | 191—25 |
| 2,824,911 | 2/1958 | Taylor | 191—25 |
| 2,824,912 | 2/1958 | Taylor | 191—43 X |
| 2,824,913 | 2/1958 | Taylor | 191—43 |
| 3,311,715 | 3/1967 | Corl et al. | 191—32 X |

FOREIGN PATENTS

| | | |
|---|---|---|
| 514,042 | 9/1952 | Belgium. |
| 885,765 | 12/1961 | Great Britain. |

ARTHUR L. LA POINT, *Primary Examiner.*

D. F. WORTH III, *Assistant Examiner.*

U.S. Cl. X.R.

191—42